(12) United States Patent
Lau et al.

(10) Patent No.: US 11,445,577 B2
(45) Date of Patent: Sep. 13, 2022

(54) GLASS LAMINATE STRUCTURE

(71) Applicant: SWANSEA UNIVERSITY, Singleton Park Swansea (GB)

(72) Inventors: Yin Cheung Lau, Swansea (GB); Timothy Claypole, Swansea (GB); David Beynon, Swansea (GB); Eifion Jewell, Swansea (GB); Justin Searle, Swansea (GB)

(73) Assignee: SWANSEA UNIVERSITY, Swansea (GB)

( * ) Notice: Subject to any disclaimer, the term of this patent is extended or adjusted under 35 U.S.C. 154(b) by 586 days.

(21) Appl. No.: 16/310,296

(22) PCT Filed: Jun. 16, 2017

(86) PCT No.: PCT/GB2017/051773
§ 371 (c)(1),
(2) Date: Dec. 14, 2018

(87) PCT Pub. No.: WO2017/216583
PCT Pub. Date: Dec. 21, 2017

(65) Prior Publication Data
US 2019/0150229 A1 May 16, 2019

(30) Foreign Application Priority Data
Jun. 17, 2016 (GB) ..................... 1610639

(51) Int. Cl.
*H05B 3/84* (2006.01)
*B32B 17/10* (2006.01)

(52) U.S. Cl.
CPC ......... *H05B 3/84* (2013.01); *B32B 17/10036* (2013.01); *B32B 17/10183* (2013.01);
(Continued)

(58) Field of Classification Search
CPC ........ B32B 17/10385; B32B 17/10036; B32B 17/10183; B32B 17/10761;
(Continued)

(56) References Cited

U.S. PATENT DOCUMENTS 3,792,232 A    2/1974   Zarenko
4,443,691 A    4/1984   Sauer
(Continued)

FOREIGN PATENT DOCUMENTS

CN    102173133    *   9/2011
CN    102173133 A     9/2011
(Continued)

OTHER PUBLICATIONS

Office Action (The First Office Action) dated Oct. 30, 2020, by the State Intellectual Property Office of People's Republic of China in corresponding Chinese Patent Application No. 201780037508.0 and an English Translation of the Office Action. (21 pages).
(Continued)

*Primary Examiner* — Shawntina T Fuqua
(74) *Attorney, Agent, or Firm* — Buchanan Ingersoll & Rooney PC

(57) ABSTRACT

A glass laminate structure is disclosed with a first and a second glass ply and a printed polymer ply interposed between the first and second glass plies, the printed polymer ply may be of PVB or PET having nanoparticle-containing ink adhered to at least a portion of a surface. Optionally there may be at least one further polymer ply which may be of PVB, PVA, COP or TPU. The nanoparticle-containing ink may contain electrically conductive nanoparticles, especially silver nanoparticle-containing ink. Also disclosed is a process for producing such a glass laminate structure.

20 Claims, 2 Drawing Sheets

(52) U.S. Cl.
CPC .. *B32B 17/10238* (2013.01); *B32B 17/10761* (2013.01); *B32B 17/10871* (2013.01); *H05B 2203/013* (2013.01); *H05B 2203/017* (2013.01); *H05B 2214/04* (2013.01)

(58) Field of Classification Search
CPC ........ B32B 17/10871; B32B 17/10238; B32B 17/10; B32B 17/10005; B32B 2637/00; H05B 3/86; H05B 3/84; H05B 2203/011; H05B 2203/014; H05B 2203/017; H05B 2203/031; H05B 2203/013; H05B 2214/02; H05B 2214/04
See application file for complete search history.

(56) References Cited

U.S. PATENT DOCUMENTS

| | | | |
|---|---|---|---|
| 4,968,553 | A | 11/1990 | Cesar |
| 5,182,431 | A | 1/1993 | Koontz et al. |
| 8,063,315 | B2 | 11/2011 | Das et al. |
| 8,302,870 | B2 | 11/2012 | Paeschke et al. |
| 9,029,181 | B2 | 5/2015 | Rhodes et al. |
| 2005/0238804 | A1 | 10/2005 | Garbar et al. |
| 2005/0238857 | A1 | 10/2005 | Day |
| 2010/0220019 | A1 | 9/2010 | Boote |
| 2012/0152930 | A1* | 6/2012 | Chamberlain .... B32B 17/10293 219/203 |
| 2013/0062120 | A1* | 3/2013 | Galonska .......... B32B 17/10091 228/173.3 |
| 2013/0228365 | A1 | 9/2013 | Uprety et al. |
| 2014/0197159 | A1* | 7/2014 | Panico .................... H05B 6/10 219/635 |
| 2015/0210872 | A1 | 7/2015 | Wery et al. |

FOREIGN PATENT DOCUMENTS

| | | |
|---|---|---|
| CN | 203901860 U | 10/2014 |
| CN | 102980930 B | 11/2014 |
| CN | 104395066 A | 3/2015 |
| EP | 0 788 294 A2 | 8/1997 |
| EP | 2 574 454 A1 | 4/2013 |
| GB | 1 145 367 A | 3/1969 |
| GB | 1 198 674 A | 7/1970 |
| GB | 1 209 777 A | 10/1970 |
| GB | 1 332 721 A | 10/1973 |
| GB | 1 365 785 A | 9/1974 |
| GB | 2 372 927 A | 9/2002 |
| JP | H05-343548 A | 12/1993 |
| JP | 2000-306463 A | 11/2000 |
| JP | 2005170740 A | 6/2005 |
| JP | 2011218610 | * 11/2011 |
| JP | 2011218610 A | 11/2011 |
| JP | 2014075115 A | 4/2014 |
| WO | 2008/062229 A2 | 5/2008 |
| WO | 2014/113463 A1 | 7/2014 |

OTHER PUBLICATIONS

Lu Huang et al., "Graphene-Based Conducting Inks for Direct Inkjet Printing of Flexible Conductive Patterns and Their Applications in Electric Circuits and Chemical Sensors", Nano. Res. 2011 (month unknown), pp. 675-684.

Response to Communication Pursuant to Rules 161(1) and 162 EPC submitted to the European Patent Office dated Aug. 1, 2019 in European Patent Application No. 17739638.9 (9 pgs).

Novacentrix webpage, Novacentrix Metalon® Conductive Inks, publication date unknown but at least as early as Jul. 9, 2020, 8 pgs, webpage retrieved from: https://www.novacentrix.com/products/metalon-conductive-inks.

Novacentrix webpage, Novacentrix Inks Summary, publication date unknown but at least as early as Jul. 9, 2020, 2 pgs, webpage retrieved from https://www.novacentrix.com/sites/default/files/pdf/NC_Inks_Summary_2017NEW.pdf.

Novacentrix webpage, Novacentrix Metalon® Conductive Inks for Printed Electronics, Sep. 2018, 1 pg—https://www.novacentrix.com/sites/default/files/pdf/Metalon%20JS-A101A%20rev1.pdf.

Venkata Krishna Rao R., et al., "Conductive Sliver Inks and Their Applications tn Printed and Flexible Electronics", RSC Advances, The Royal Society of Chemistry, Aug. 25, 2015, 32 pp. 77760-77790.

Search Report (Patent Act 1997: Search Report under Section 17(5)) dated Dec. 5, 2016, by the United Kingdom Intellectual Property Office in corresponding United Kingdom Patent application No. 1610639.5 (3 pages).

International Search Report (PCT/ISA/210) dated Oct. 10, 2017, by the European Patent Office as the International Searching Authority for International Application No. PCT/GB2017/051773.

Written Opinion (PCT/ISA/237) dated Oct. 10, 2017, by the European Patent Office as the International Searching Authority for International Application No. PCT/GB2017/051773.

Office Action (Notice of Reasons for Refusal) dated Mar. 30, 2021, by the Japanese Patent Office in corresponding Japanese Patent Application No. 2018-566334 and an English Translation of the Office Action. (7 pages).

Office Action (Notification of Second Office Action) dated Aug. 4, 2021, by the China National Intellectual Property Administration in corresponding Chinese Patent Application No. 201780037508.0 and an English Translation of the Office Action. (18 ages).

* cited by examiner

GLASS LAMINATE STRUCTURE

The present invention relates to glass laminate structures, to processes for producing glass laminate structures and to vehicle glazings comprising such glass laminate structures.

Laminated glass may be used in both the automotive and architectural fields to provide laminated glazings. Laminated glass usually comprises at least one polymer interlayer, often of polyvinyl butyral (PVB), bonded between two plies of glass. The laminating process usually takes place under heat and pressure, after which the PVB interlayer becomes optically clear and adheres strongly to the glass plies. The resulting laminate behaves as a single unit.

Glass, in particular for automotive uses, either single sheets or laminates, may be provided with electrically conductive features often screen-printed and then fired on glass substrates using a silver-containing ink mixed with a relatively low melting glass frit. Printing and firing the silver-containing ink requires heat treatment to above 400° C. that may be done during shaping or toughening of glass substrates or may require a separate heating step. Typical inks for printing electrical circuits on glass comprise 50 to 83 wt % elemental silver as e.g. flakes, 3 to 6% glass frit and 1 to 12% other additives (e.g. colour improvers). On heating the glass to a sufficiently high temperature, the frit melts and fuses to the glass surface and the silver flakes or particles sinter.

Electrically conductive features may be used for the elements of heating circuits on e.g. rear automotive glazings to enable the glass to be demisted in humid, wet or cold weather conditions. The conductive features may also be used for other functions such as antennae, sensors, glazing lighting systems or busbars.

U.S. Pat. No. 5,182,431 discloses an electrical resistance heated window having three or more heatable zones connected in series. The zones consist of a plurality of vertical, electrically conducting resistive filaments, and the electrical heating system may be applied to the window by well-known screen printing techniques.

WO-A-2008/062229 discloses an improved electrically conductive ink for printing on automotive glass having improved resistance to scratching.

There is a need to provide further electrical features on, in particular, automotive glazings. For examples, heating circuits may additionally or alternatively be provided by using wires embedded within a laminate, or by printing with a conductive ink on to one of the inner surfaces of the glass layers.

GB-A-1,365,785 discloses a window provided with an array of wires for heating. EP-A-0 788 294 discloses a window provided with an array of wires for heating and also discloses a method by which such windows may be manufactured.

GB-A-2,372,927 describes a heating circuit comprising at least two heating banks comprising a plurality of heating elements which extend over the vehicle window between bus bars, said elements being formed from screen printed heat-resistant conductive ink on the glass or conductive wires contacting the interlayer of a laminated vehicle window.

Other electrical components have also been used in laminated glazings.

US-A-2013/0228365 discloses aircraft glazings laminated with a conductive mesh that is inkjet printed on a polymer film that may be PET, polycarbonate or PU. The conductive mesh is for de-icing or electro-magnetic shielding and can have a sheet resistant of under 100 $\Omega$/sq.

US-A-2010/0220019 discloses conductive indium tin oxide coatings screen printed on to glass in a laminate. The printing thickness may be 10 to 250 nm.

U.S. Pat. No. 4,443,691 discloses electrically heated windows including a laminate with a polyester film to which a resistive layer may be applied.

EP-A-2 574 454 discloses a window having printable layers of PET and adhesive layers of PVB between glass sheets. Printed electronic structures such as sensors and antennae are provided on a surface of the printable layer facing the surface of a glass sheet.

US-A-2005/238,857 describes a laminated glazing panel comprising two glass plies and a plastic ply having one or more light emitting diodes mounted on a circuit board laminated between the glass plies, forming an LED device. The circuit board is ordinarily a flexible circuit board comprising a substrate (of, for example, polyimide or polyester) and a conductive layer (for example, a copper foil or conductive ink).

There exists a need to provide an alternative method for providing conductive features on glass laminates. It is an aim of the present invention to address this need.

The present invention accordingly provides, in a first aspect, a glass laminate structure comprising: a first glass ply, a second glass ply, a printed polymer ply interposed between the first and second glass plies, and optionally at least one further polymer ply, wherein the printed polymer ply comprises nanoparticle-containing ink adhered to at least a portion of at least one surface thereof.

Such a glass laminate is advantageous because, surprisingly, it provides for functional (or decorative) printing on the inside surface of the laminate by printing on a polymer ply. Previously, it had been thought that printing on to the glass substrates, requiring high temperature treatments to successfully fire the ink, was necessary. Since features, e.g. electrically conductive features, may be printed inside the laminate, it enables other features to be printed on the other surface of the laminate especially the glass plies. This provides further functionality of laminated glazings.

The nanoparticle-containing ink will usually comprise electrically conductive nanoparticles.

Preferably, the nanoparticle-containing ink comprises an inorganic nanoparticle-containing ink, more preferably a silver nanoparticle-containing ink. Silver nanoparticle inks enable electrically conductive features to be provided with great advantages in providing functionality to glass laminate structures especially in e.g. automotive glazings. Other preferred nanoparticle materials, which also have the advantage of being electrically conductive, include one or more of Cu, copper oxide (that may be reduced to copper after printing), Pt, Pd, and Au.

Thus, the portion of at least one surface of the printed polymer ply may be electrically conductive. The printed portion of at least one surface of the printed polymer ply will preferably have a sheet resistance in the range 0.005 $\Omega$/square to 200 $\Omega$/square, usually 0.05 $\Omega$/square to 200 $\Omega$/square, more usually 0.1 $\Omega$/square to 200 $\Omega$/square and most usually 0.5 $\Omega$/square to 200 $\Omega$/square.

Usually, the printed polymer ply will be laminated to at least one other ply in the laminate structure. The at least one other ply may be a glass ply or a further polymer ply. Lamination provides good adhesion and ensures the protection of the printed portion of the printed polymer laminate, in use.

Advantageously, the nanoparticles (preferably, before heating) may have a dimension in the range 1 nm to 150 nm, usually 1 nm to 100 nm, preferably 5 nm to 80 nm, more preferably 8 nm to 70 nm, most preferably 10 nm to 60 nm. Particle size may be determined by various methods, for example by dynamic light scattering.

Such dimensions of the particles are advantageous because they provide that sintering may take place even at the relatively low temperatures compatible with the polymer ply.

The printed polymer ply may comprise polyvinyl butyral (PVB), polyvinyl acetate (PVA) and themioplastic polyurethane (TPU) or polyethylene terephthalate (PET). PVB (PVA and TPU) is/are advantageous because of good lamination to glass. PET is advantageous because it provides a particularly stable surface for printing even at relatively elevated temperatures.

The printed polymer ply may be textured. The textured surface may form shallow channels on the polymer ply surface. This may be advantageous because it provides improved routes for gases released from the ink on heating/lamination and for e.g. plasticiser from the polymer ply or plies during heating/lamination.

Preferably, the glass laminate structure further comprises at least one further polymer ply, the further polymer ply comprising a polymer selected from polyvinyl butyral (PVB), polyvinyl acetate (PVA), polyethylene terephthalate (PET), cyclic olefin copolymer (COP) and thermoplastic polyurethane (TPU), preferably PVB.

Thus, in preferred embodiments, the glass laminate structure may comprise a first PVB polymer ply, the printed polymer ply and a second PVB polymer ply. The printed polymer ply may comprise PET.

In other preferred embodiments, the glass laminate structure may comprise a printed PVB polymer ply and a second PVB polymer ply.

Usually, the thickness of the printed polymer ply is in the range 20 μm to 2000 μm. For some polymers (e.g. PET) the thickness of the printed polymer ply may be in the range 20 μm to 80 μm. For other polymers (e.g. PVB) the thickness of the printed polymer ply may be in the range 200 μm to 800 μm, as may the thickness of PVB further polymer plies.

Preferably, the nanoparticle-containing ink has not undergone a separate sintering process.

In a second aspect, the present invention provides a glass laminate structure comprising: a first glass ply, a first PVB ply, a second PVB ply, a printed polymer ply interposed between the first and second PVB plies, and a second glass ply; wherein the printed polymer ply comprises nanoparticle-containing ink adhered to at least a portion of at least one surface thereof.

In a third aspect, the present invention provides a glass laminate structure comprising: a first glass ply; a printed PVB ply, a second PVB ply, and a second glass ply; wherein the printed polymer ply comprises nanoparticle-containing ink adhered to at least a portion of at least one surface thereof.

Optional and preferred features of the second and third aspects of the invention are as described above in relation to the first aspect of the invention.

Glass laminate structures according to the first and second aspects of the invention may be made by lamination processes.

Thus, the present invention according provides, in a fourth aspect, a process for producing a glass laminate structure, the process comprising: a) providing a first glass ply and a second glass ply, b) providing a printed polymer ply having a nanoparticle-containing ink adhered to at least a portion of at least one surface thereof, and c) interposing the printed polymer ply between the first and second glass plies.

The process will preferably further comprise heating the glass laminate structure to a pre-nip temperature preferably in the range 80° C. to 99° C. This is advantageous because it tends to soften the polymer plies (e.g. of PVB) and ensures good adhesion between the plies before subsequent lamination steps. A pre-nip temperature in the range 80° C. to 99° C. is particularly useful for PVB, other polymers may have other useful ranges of temperature, e.g. over 60° C. to 200° C.

Optionally, the process will further comprise applying reduced pressure to the glass laminate structure during heating to the temperature in the range 80° C. to 99° C. This is advantageous because it improves out-gassing of the polymers and ink, reducing the possibility of bubble formation or subsequent poor lamination.

The process preferably further comprises lamination by heating the printed polymer ply to a lamination temperature in the range 90° C. to 160° C., thereby preferably laminating the glass laminate structure and preferably sintering the nanoparticle containing ink at the same time. One of the great advantages of the present invention is that lamination, even at this relatively low temperature range, also results in firing/sintering of the nanoparticle containing ink, so that a separate sintering step is not usually required, thereby improving efficiency of manufacture.

Optionally, the process further comprises applying pressure in the range of 1 bar to 20 bar (100 kPa to 2000 kPa) to the glass laminate structure during heating to the lamination temperature in the range 90° C. to 160° C.

The process may usually also include the step whereby the printed polymer ply is printed with the nanoparticle-containing ink. Thus, preferably, providing a printed polymer ply comprises printing a polymer ply with the nanoparticle-containing ink.

Printing the polymer ply may use generally any suitable printing process. Thus, the printing step may use a printing method selected from roller coating, screen printing, gravure, flexography, lithography, pad printing, inkjet, and aerosol printing.

The ink will usually comprise nanoparticles and at least one solvent.

The solvent may be selected from a straight or branched chain $C_2$ to $C_{12}$ alcohol, preferably a $C_5$ to $C_{10}$ straight or branched chain alcohol, and more preferably a branched chain $C_8$ alcohol (preferably isooctyl alcohol); a polyether, and preferably propylene glycol; and water.

The ink may comprise 10% and 80% by wt nanoparticles, preferably between 20% and 70% by wt nanoparticles.

The process may further comprise a step of depositing a conductive layer on the nano-particle containing ink before interposing the printed polymer ply between the first and second glass plies. This is advantageous because it may increase electrical conductivity. Depositing the conductive layer may be by an electrodeposition or electroless-deposition process. The conductive layer will usually be a metallic layer and may comprise copper or silver or other suitable electrically conductive material.

Preferably, the nanoparticle-containing ink has not undergone a separate sintering step in the process.

The aspects of the invention have many potential uses, especially in automotive glazings.

Thus, in a fifth aspect, the present invention provides, a vehicle glazing, comprising a glass structure laminate according to the first, second or third aspect.

In a sixth aspect, the present invention provides a vehicle comprising a glazing according to the fourth aspect.

The glass laminate structure of the present invention has many potential uses in automotive (or architectural) glazings, for example it may be used in vehicle heated wiper area, vehicle windscreen/mirror demister, sensors (capacitors), lighting systems and generally as bus bars.

The present invention is advantageous because it provides that the printing of inks, especially conductive inks, on laminates can be separated from the laminating process, in time and distance. Printed polymer plies (e.g. PET or PVB sheets) can be rolled up for storage or shipment to the glass production site. Handling and transporting glass components is kept to a minimum. The invention is particularly advantageous because it enables printed features to be added to glazings at any time in the manufacturing process e.g. either before, or after, shaping of glass, thus separating the printing stage from the shaping stage in production of glazing products.

The present invention will now be described by way of example only, and with reference to, the accompanying drawings, in which.

Figure 1:
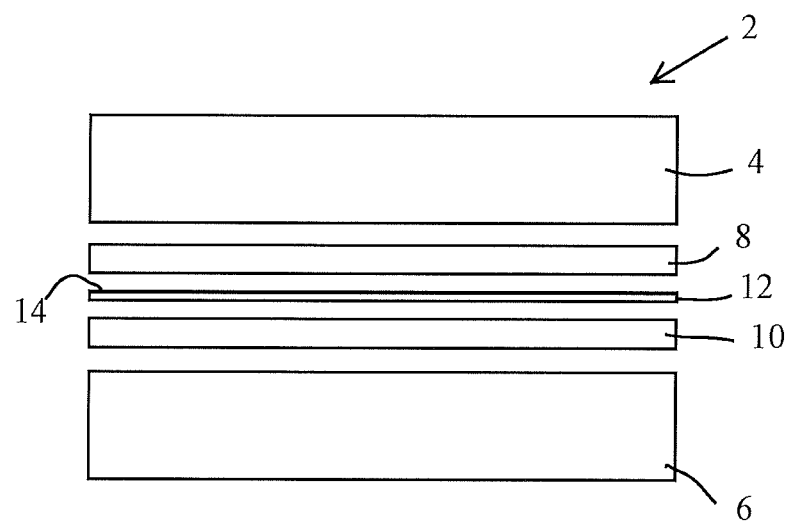
FIG. 1 illustrates a schematic, not to scale, exploded view of a glass laminate structure according to a first embodiment of the present invention.

FIG. 1 illustrates schematically and not to scale an exploded view of a glass laminate according to the invention. The laminate 2 comprises a first glass ply 4 and a second glass ply 6. Each glass ply is approximately 2.1 mm thick. Between the glass plies 4, 6 are a first PVB ply 8 (about 0.33 mm thick) and a second PVB ply 10 (about 0.38 mm thick). Interposed between the first and second PVB plies 8, 10 is a printed polymer ply 12 of PET (about 50 μm thick) having a printed surface 14 of silver nanoparticle ink (about 1.5 μm dry thickness).

Figure 2:
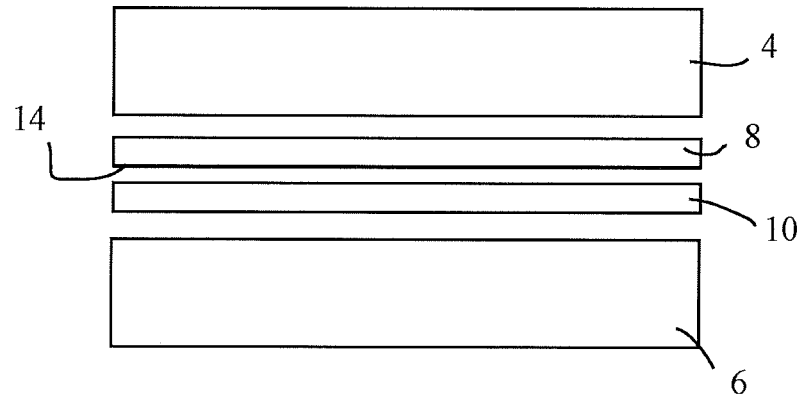
FIG. 2 illustrates a schematic, not to scale, exploded view of a glass laminate structure according to a second embodiment of the present invention.
Figure 3:
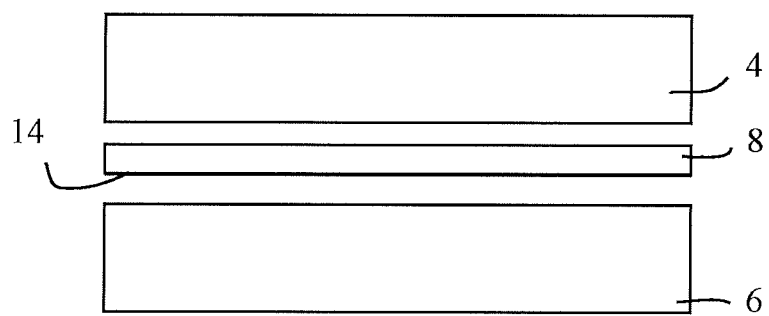
FIG. 3 illustrates a schematic, not to scale, exploded view of a glass laminate structure according to a third embodiment of the present invention.

In FIGS. 2 and 3 the same reference numerals are used to indicate the same or similar features.

FIG. 2 illustrates schematically and not to scale an exploded view of a second glass laminate according to the invention. The first and second glass plies 4, 6 and first and second PVB plies 8, 10 are present. However, in this embodiment, the printed polymer ply is the first PVB ply 8 (about 0.38 mm thick) having a printed surface 14 of silver nanoparticle ink (about 1.5 μm dry thickness).

FIG. 3 illustrates schematically and not to scale an exploded view of a third glass laminate according to the invention. The same reference numerals are used to indicate the invention. The first and second glass plies 4, 6 and first PVB ply 8 are present. However, in this embodiment, the second PVB ply is not present and the printed polymer ply is the first PVB ply 8 having a printed surface 14 of silver nanoparticle ink (about 1.5 μm dry thickness).

In some embodiments, the printed surface of the polymer layer in the laminate may have a further conductive layer deposited on the nanoparticle ink.

The invention is further illustrated, but not limited, by the following Examples.

EXAMPLES 1 TO 16

PET-PVB duplet substrates (30 cm×30 cm; 50 μm thick PET and 330 μm thick PVB, the PVB and PET plies adhered together) were coated/printed with silver nano-particle containing flexographic silver ink using a K Bar coater (US3 Wire gauge, speed set at 3). The coating was applied to the surface of the PET ply.

The coating area was approximately 10 cm×10 cm, with a dry coating thickness of approximately 1.5 μm (as measured by DekTak profilometer). The samples were then air dried.

Bus bars of tinned copper were applied to the top and bottom boundaries of the coated area.

A second PVB ply (thickness 380 μm) was applied to the PET side of the PET-PVB duplet.

Two glass plies (2.1 mm thick) were placed on either side of the polymer plies.

A pre-nip process was applied to the laminates by heating to 95° C. under reduced pressure in a vacuum bag to adhere and out-gas the polymer plies.

The structures were then subjected to a lamination process by heating at 125° C. under 10 bar (1000 kPa) of pressure in an autoclave.

The circuit resistance of the laminates as prepared, after pre-nip and after lamination was determined. The results for the circuit resistance measurements are indicated in Tables 1 to 3 below.

Measurements were Taken at Three Locations:

1. both connectors connected to the top bus bar ("Top");
2. both connectors connected to the bottom bus bar ("Bottom"); and
3. connectors connected diagonally between the top and bottom bus bars ("Diagonal"; X).

Measurements were Taken:

1. after the prototype has been assembled (see Table 1),
2. after the pre nip cycle (see Table 2); and
3. after the autoclave cycle (see Table 3).

The circuit resistance of control samples was also determined to show the change in resistance during the lamination cycle: control sample 1 containing a bus bar (I configuration), and control sample 2 containing 3 bus bars connected together (H configuration) and to show that the bus bars were not affecting the results.

TABLE 1

Circuit resistance PET-PVB duplet after assembly

| Example | Circuit Resistance (Ω) | | |
|---|---|---|---|
|  | Top | Bottom | Diagonal |
| 1 | 0.014 | 0.014 | 0.099 |
| 2 | 0.014 | 0.015 | 0.064 |
| 3 | 0.014 | 0.015 | 0.105 |
| 4 | 0.015 | 0.015 | 0.127 |
| 5 | 0.017 | 0.018 | 0.077 |
| 6 | 0.014 | 0.014 | 0.135 |
| 7 | 0.018 | 0.018 | 0.112 |
| 8 | 0.015 | 0.016 | 0.115 |
| 9 | 0.015 | 0.017 | 0.147 |
| 10 | 0.014 | 0.016 | 0.099 |
| 11 | 0.015 | 0.015 | 0.095 |
| 12 | 0.016 | 0.015 | 0.101 |
| 13 | 0.015 | 0.016 | 0.132 |
| 14 | 0.016 | 0.015 | 0.103 |
| 15 | 0.017 | 0.016 | 0.145 |
| 16 | 0.015 | 0.016 | 0.162 |
| 3 bus bars | 0.014 | 0.015 | 0.024 |
| 1 bus bar | 0.015 |  |  |

TABLE 2

Circuit resistance PET-PVB duplet after pre nip.

| | Circuit Resistance (Ω) | | |
|---|---|---|---|
| Example | Top | Bottom | Diagonal |
| 1 | 0.015 | 0.015 | 0.050 |
| 2 | 0.015 | 0.015 | 0.037 |
| 3 | 0.014 | 0.015 | 0.154 |
| 4 | 0.015 | 0.015 | 0.062 |
| 5 | 0.015 | 0.015 | 0.040 |
| 6 | 0.014 | 0.014 | 0.058 |
| 7 | 0.015 | 0.014 | 0.057 |
| 8 | 0.015 | 0.015 | 0.060 |
| 9 | 0.015 | 0.014 | 0.065 |
| 10 | 0.015 | 0.014 | 0.051 |
| 11 | 0.015 | 0.014 | 0.047 |
| 12 | 0.014 | 0.014 | 0.047 |
| 13 | 0.014 | 0.014 | 0.064 |
| 14 | 0.016 | 0.015 | 0.052 |
| 15 | 0.015 | 0.016 | 0.066 |
| 16 | 0.015 | 0.014 | 0.080 |
| 3 bus bars | 0.014 | 0.014 | 0.020 |
| 1 bus bar | 0.015 | | |

TABLE 3

Circuit resistance PET-PVB duplet after autoclave cycle

| | Circuit Resistance (Ω) | | |
|---|---|---|---|
| Example | Top | Bottom | Diagonal |
| 1 | 0.014 | 0.014 | 0.035 |
| 2 | 0.014 | 0.014 | 0.026 |
| 3 | 0.013 | 0.014 | 0.037 |
| 4 | 0.015 | 0.015 | 0.041 |
| 5 | 0.015 | 0.015 | 0.028 |
| 6 | 0.016 | 0.015 | 0.040 |
| 7 | 0.014 | 0.014 | 0.038 |
| 8 | 0.014 | 0.014 | 0.039 |
| 9 | 0.015 | 0.016 | 0.045 |
| 10 | 0.014 | 0.015 | 0.037 |
| 11 | 0.015 | 0.015 | 0.035 |
| 12 | 0.015 | 0.015 | 0.034 |
| 13 | 0.015 | 0.015 | 0.045 |
| 14 | 0.015 | 0.015 | 0.035 |
| 15 | 0.015 | 0.015 | 0.044 |
| 16 | 0.015 | 0.016 | 0.052 |
| 3 bus bars | 0.014 | 0.015 | 0.024 |
| 1 bus bar | 0.015 | | |

EXAMPLES 17 TO 20

PVB polymer plies (30 cm×30 cm; 0.38 mm thick PVB) were coated/printed with silver nano-particle containing flexographic silver ink using a K Bar coater (US3 Wire gauge, speed set at 3).

The coating area was approximately 10 cm×10 cm. After coating, the samples were air dried.

Bus bars of tinned copper were applied to the top and bottom boundaries of the coated area.

A second (non-printed) PVB ply (0.38 mm thick) was positioned on the printed side of the printed PVB ply. Two glass plies (2.1 mm thick) were placed on either side of the PVB.

A pre-nip process was applied to the laminates by heating to 95° C. under reduced pressure in a vacuum bag for 1 hour to adhere and out-gas the polymer plies.

The assemblies were then subjected to a lamination process by heating at 125° C. under 10 bar (1000 kPa) of pressure for 45 minutes in an autoclave. The sheet resistance of the laminates on assembly, after pre-nip and after lamination was determined using a Nagy SRM-12 (to measure non-contact sheet resistance). The results are indicated in Table 4.

TABLE 4

| Example | On Assembly Nagy (Ω/square) | After Prenip Nagy (Ω/square) | After Autoclave Nagy (Ω/square) |
|---|---|---|---|
| 17 | 12.71 | 0.201 | 180.2 |
| 18 | 13.41 | 0.239 | 163.2 |
| 19 | 13.07 | 0.201 | 173.7 |
| 20 | 12.71 | 0.286 | 176.3 |

EXAMPLES 21 TO 28

These examples were made using nano-silver screen ink printed on (50 cm×50 cm) 175 μm thick PET (SU 330). The screen that was used was a 61/64 mesh giving a wet coating thickness of around 36 μm. Eight samples were produced. Once printed and air dried, four of the samples were plated in an electroplating bath to deposit around 10 μm copper layer above the printed area. The samples were laminated using PVB sheets (each 0.76 mm thick) and two glass plies (2.1 mm thick).

The conductivity of the printed and plated samples was too low to measure using non-contact measurement so busbars were applied to provide an area 50 mm wide with a 45 mm separation. Pre-nip conditions were 45 mm cold de-air in a vacuum bag followed by 1 hr at 95° C. (still in the vacuum bag). The samples were autoclaved (1 hr, 125° C., 10 bar pressure).

Resistance measurements are shown in Table 5, below, for the printed only samples (Examples 21 to 24) and the printed and plated samples (Examples 25 to 28). The measurements include the busbar resistance, and the contact resistance between the busbar and measurement area. However, by comparing measurements of the printed and printed and plated samples such contributions cannot account for the changes measured on the plated samples.

TABLE 5

| Example | Printed and/or plated | On Assembly (Ω) | After Prenip (Ω) | After Autoclave (Ω) |
|---|---|---|---|---|
| 21 | Printed only | 0.082 | 0.053 | 0.047 |
| 22 | Printed only | 0.088 | 0.061 | 0.050 |
| 23 | Printed only | 0.085 | 0.060 | 0.049 |
| 24 | Printed only | 0.086 | 0.059 | 0.049 |
| 25 | Printed and Plated | 0.012 | 0.012 | 0.012 |
| 26 | Printed and Plated | 0.010 | 0.010 | 0.010 |
| 27 | Printed and Plated | 0.010 | 0.010 | 0.010 |
| 28 | Printed and Plated | 0.011 | 0.011 | 0.011 |

The invention claimed is:

1. A process for producing a glass laminate structure, the process comprising:
   a) providing a first glass ply and a second glass ply;
   b) providing a printed polymer ply having a nanoparticle-containing ink adhered to at least a portion of at least one surface thereof;
   c) interposing the printed polymer ply between the first and second glass plies; and d) after step c), heating the printed polymer ply to a temperature in the range of 90° C. to 160° C., thereby laminating the glass structure and firing/sintering the nanoparticle containing ink.

2. The process as claimed in claim 1, further comprising applying pressure in the range of 1 bar to 20 bar to the glass laminate structure during heating to the temperature in the range 90° C. to 160° C.

3. The process as claimed in claim 1, wherein providing a printed polymer ply comprises printing a polymer ply with the nanoparticle-containing ink.

4. A process as claimed in claim 3, wherein printing the polymer ply uses a printing method selected from roller coating, screen printing, gravure, flexography, lithography, pad printing, inkjet, and aerosol printing.

5. A process as claimed in claim 1, wherein the ink comprises nanoparticles and at least one solvent.

6. A process as claimed in claim 5, wherein the solvent is selected from a straight or branched chain $C_2$ to $C_{12}$ alcohol; a polyether; and water.

7. A process as claimed in claim 1, wherein the ink comprises between 10% and 80% by wt nanoparticles.

8. A process as claimed in claim 1, further comprising a step of depositing a conductive layer on the nano-particle containing ink before interposing the printed polymer ply between the first and second glass plies.

9. A process as claimed in claim 8, wherein depositing a conductive layer is by an electrodeposition or electroless-deposition process.

10. A process as claimed in claim 8, wherein the conductive layer comprises copper.

11. A process as claimed in claim 1, wherein the nanoparticle-containing ink has not undergone a separate sintering step.

12. The process as claimed in claim 1, wherein the nanoparticle-containing ink comprises electrically conductive nanoparticles.

13. The process as claimed in claim 1, wherein the nanoparticle-containing ink comprises an inorganic nanoparticle-containing ink.

14. The process as claimed in claim 1, wherein the printed portion of at least one surface of the printed polymer ply is electrically conductive.

15. The process as claimed in claim 1, wherein the printed portion of at least one surface of the printed polymer ply is electrically conductive and has a sheet resistance in the range 0.005 Ω/square to 200 Ω/square.

16. The process as claimed in claim 1, wherein the nanoparticles before heating have a dimension in the range 1 nm to 150 nm.

17. The process as claimed in claim 1, wherein the printed polymer ply comprises polyvinyl butyral (PVB), polyvinyl acetate (PVA), thermoplastic polyurethane (TPU) or polyethylene terephthalate (PET).

18. The process as claimed in claim 1, wherein the printed polymer ply is textured.

19. The process as claimed in claim 1, further comprising providing at least one further polymer ply, the further polymer ply comprising a polymer selected from polyvinyl butyral (PVB), polyvinyl acetate (PVA), polyethylene terephthalate (PET), cyclic olefin copolymer (COP) and thermoplastic polyurethane (TPU).

20. The process as claimed in claim 1, wherein the thickness of the printed polymer ply is in the range 20 μm to 2000 μm.

* * * * *